(12) United States Patent
Brandauer

(10) Patent No.: US 11,450,171 B2
(45) Date of Patent: Sep. 20, 2022

(54) KIOSK FOR STORING AND DISTRIBUTING BAKED PRODUCT AND ASSOCIATED SYSTEMS AND METHODS

(71) Applicant: Wilkinson Research and Development, LLC, Charlestown (KN)

(72) Inventor: Paul W. H. Brandauer, Walla Walla, WA (US)

(73) Assignee: WILKINSON RESEARCH AND DEVELOPMENT, LLC, Charlestown (KN)

( * ) Notice: Subject to any disclaimer, the term of this patent is extended or adjusted under 35 U.S.C. 154(b) by 0 days.

(21) Appl. No.: 15/733,569

(22) PCT Filed: Mar. 1, 2019

(86) PCT No.: PCT/IB2019/000211
§ 371 (c)(1),
(2) Date: Aug. 28, 2020

(87) PCT Pub. No.: WO2019/175655
PCT Pub. Date: Sep. 19, 2019

(65) Prior Publication Data
US 2020/0410806 A1 Dec. 31, 2020

Related U.S. Application Data

(60) Provisional application No. 62/637,386, filed on Mar. 1, 2018.

(51) Int. Cl.
*G07F 11/66* (2006.01)
*G07F 17/00* (2006.01)
(Continued)

(52) U.S. Cl.
CPC .......... *G07F 17/0078* (2013.01); *G07F 9/105* (2013.01); *G07F 11/165* (2013.01); *G07F 11/66* (2013.01)

(58) Field of Classification Search
CPC ....... G07F 17/0078; G07F 9/105; G07F 11/65
See application file for complete search history.

(56) References Cited

U.S. PATENT DOCUMENTS 2,897,772 A   8/1959  Hunter
2,930,310 A   3/1960  Hans
(Continued)

FOREIGN PATENT DOCUMENTS

DE   102004052982 A1   5/2006
FR       1504813 A    12/1967
(Continued)

OTHER PUBLICATIONS

International Search Report and Written Opinion dated Sep. 9, 2019; International Application No. PCT/IB2019/000211; 10 pages.

*Primary Examiner* — Gene O Crawford
*Assistant Examiner* — Ayodeji T Ojofeitimi
(74) *Attorney, Agent, or Firm* — Fortem IP LLP; Mary L. Fox

(57) ABSTRACT

The present technology is directed to a kiosk for storing, displaying, and distributing a plurality of baked products. The kiosk may include, for example, a housing defining a chamber therein and configured to receive a plurality of baked products. The kiosk may include one or more sensors configured to analyze the individual baked products to determine one or more baked unit parameters and adjust one or more baking inputs based on the measured parameters.

20 Claims, 4 Drawing Sheets

(51) Int. Cl.
*G07F 9/10* (2006.01)
*G07F 11/16* (2006.01)

(56) References Cited

U.S. PATENT DOCUMENTS

| | | |
|---|---|---|
| 2,953,460 A | 9/1960 | Baker |
| 3,385,204 A | 5/1968 | Richardson |
| 3,882,768 A | 5/1975 | Troisi et al. |
| 4,028,024 A | 6/1977 | Moreland |
| 4,437,766 A | 3/1984 | Joachim |
| 4,514,167 A | 4/1985 | Royer |
| 4,517,447 A | 5/1985 | Hicks |
| 4,630,930 A | 12/1986 | Seiling |
| 4,882,981 A | 11/1989 | Bacigalupe et al. |
| 4,938,127 A | 7/1990 | Van |
| 5,103,719 A | 4/1992 | Mani |
| 5,109,758 A | 5/1992 | Voegtlin |
| 5,309,824 A | 5/1994 | Dromgoole et al. |
| 5,404,796 A | 4/1995 | Campbell et al. |
| 5,458,415 A | 10/1995 | Poilane |
| 5,479,850 A | 1/1996 | Anderson |
| 5,522,310 A * | 6/1996 | Black, Sr. ............... A47J 27/14 221/113 |
| 5,538,414 A | 7/1996 | Kobayashi et al. |
| 5,605,708 A | 2/1997 | Cummins et al. |
| 6,065,392 A | 5/2000 | Florindez |
| 6,361,307 B1 | 3/2002 | Bernhard et al. |
| 6,378,324 B1 * | 4/2002 | Percy .................. F25D 19/02 221/150 R |
| 6,450,086 B1 | 9/2002 | Martinez |
| 8,091,471 B2 | 1/2012 | Larsen |
| 8,827,068 B2 | 9/2014 | Weiss |
| 9,538,766 B2 | 1/2017 | Weiss |
| 11,026,432 B2 | 6/2021 | Brandauer et al. |
| 2001/0038876 A1 | 11/2001 | Anderson |
| 2005/0189364 A1 | 9/2005 | Herzog et al. |
| 2006/0120212 A1 | 6/2006 | Taniguchi et al. |
| 2006/0182609 A1 | 8/2006 | Guerra |
| 2008/0135574 A1* | 6/2008 | Hieb ....................... G07F 11/10 221/123 |
| 2008/0163762 A1 | 7/2008 | Weiss |
| 2008/0181992 A1 | 7/2008 | Willett |
| 2010/0237091 A1* | 9/2010 | Garson ................... G07F 9/026 221/226 |
| 2011/0070342 A1 | 3/2011 | Wilkens |
| 2011/0129577 A1 | 6/2011 | De et al. |
| 2012/0006843 A1* | 1/2012 | Kim ....................... B65B 37/04 221/1 |
| 2013/0224355 A1 | 8/2013 | Bernhardt |
| 2014/0224826 A1* | 8/2014 | Otzen .................... G07F 9/105 221/1 |
| 2018/0249721 A1 | 9/2018 | Brandauer et al. |
| 2021/0289795 A1 | 9/2021 | Brandauer et al. |

FOREIGN PATENT DOCUMENTS

| | | |
|---|---|---|
| FR | 2515001 A1 | 4/1983 |
| KR | 20120097586 A | 9/2012 |
| WO | 8809614 A1 | 12/1988 |
| WO | WO1988009614 A1 | 12/1988 |
| WO | WO2006113446 A1 | 10/2006 |
| WO | 2017025537 A1 | 2/2017 |
| WO | 2017031383 A1 | 2/2017 |

* cited by examiner

KIOSK FOR STORING AND DISTRIBUTING BAKED PRODUCT AND ASSOCIATED SYSTEMS AND METHODS

CROSS-REFERENCE TO RELATED APPLICATION(S)

The present application is a 371 U.S. national phase application of International Application No. PCT/IB2019/000211, filed Mar. 1, 2019, which claims the benefit of priority to U.S. Provisional Application No. 62/637,386, filed Mar. 1, 2018, the entireties of which are incorporated by reference herein.

TECHNICAL FIELD

Embodiments of the present technology are directed to kiosks for providing and distributing baked product, such as bread, and associated systems and methods.

BACKGROUND

Currently customers purchase bread from the shelves of a local supermarket. Because bread has a limited shelf-life (as compared to other food products available on the shelves), providing fresh bread to customers requires a high amount of manual labor for the supermarket, such as stacking the bread on the shelves, organizing the bread by brand and/or type of bread, etc. Moreover, the customer is faced with a limited number of options, all of which have been pre-selected by the supermarket. Accordingly, there is a need for an improved system for providing bread to customers.

SUMMARY

The present technology is directed to automated production systems and associated processes, and, more particularly, to an automated bread making system and associated processes. The subject technology is illustrated, for example, according to various aspects described below, including with reference to FIGS. 1-2C. Various examples of aspects of the subject technology are described as numbered clauses (1, 2, 3, etc.) for convenience. These are provided as examples and do not limit the subject technology.

1. A kiosk for storing, displaying, and distributing a plurality of baked units, the kiosk comprising:
   a housing defining a chamber therein;
   a receiving element positioned within the chamber and configured to receive and support one or more of the baked units;
   a carrier configured to move horizontally and vertically within the chamber, the carrier being configured to receive and carry one or more of the baked units;
   one or more sensors configured to analyze the individual baked units to determine one or more baked unit parameters, the baked unit parameters including one or more of a height, a color, a surface topography, a temperature, a volume, and/or a shape of the individual baked units;
   a plurality of receptacles disposed within the chamber and individually configured to support one or more of the baked units; and
   a controller coupled to the carrier and the sensors, the controller having memory and processing circuitry and configured to:
   in response to detecting the presence of a baked unit at the receiving element, (a) move the carrier proximate the receiving element and procure the baked unit from the receiving element, and (b) deliver the baked unit to one of the plurality of receptacles; and
   move the carrier to retrieve a particular baked unit from its receptacle and deliver the particular baked unit to an opening in the housing through which a customer may retrieve the particular baked unit.

2. The kiosk of Clause 1, wherein the carrier is moveable along vertical and horizontal tracks positioned within the chamber, and wherein the carrier includes an extender that is configured to extend and retract in a direction generally orthogonal to the vertical and horizontal tracks.

3. The kiosk of Clause 1 or Clause 2, wherein the carrier includes an extender that is configured to extend away from the carrier towards one of the receptacles proximate the carrier to deliver a baked unit to the receptacle.

4. The kiosk of any one of Clauses 1 to 3, wherein the kiosk is a standalone kiosk.

5. The kiosk of any one of Clauses 1 to 4, wherein the housing surrounds the chamber such that an internal environment of the chamber is self-contained.

6. The kiosk of any one of Clauses 1 to 5, wherein the chamber has a controlled temperature.

7. The kiosk of any one of Clauses 1 to 6, wherein the chamber has a controlled pressure.

8. The kiosk of any one of Clauses 1 to 7, wherein the chamber has a controlled humidity.

9. The kiosk of any one of Clauses 1 to 8, wherein the kiosk is configured to be coupled to an adjacent kiosk, and wherein the adjacent kiosk provides the baked unit to the receiving element of the kiosk.

10. The kiosk of any one of Clauses 1 to 9, wherein a side portion of the housing includes an opening through which the adjacent kiosk transfers the baked unit to the kiosk.

11. The kiosk of any one of Clauses 1 to 10, wherein the controller receives data from the one or more sensors characterizing one or more of the baked unit parameters and compares the data to a predetermined data set of baked unit parameters.

12. The kiosk of any one of Clauses 1 to 11, wherein at least one of the one or more sensors is an imaging device coupled to the controller and configured to send image data of the baked units to the controller for processing.

13. The kiosk of any one of Clauses 1 to 12, wherein the controller determines at least one of the baked unit parameters based on the image data.

14. The kiosk of any one of Clauses 1 to 13, wherein the receiving element is a first receiving element and the kiosk further comprises a second receiving element positioned within the chamber and configured to receive and support a baked unit.

15. The kiosk of any one of Clauses 1 to 14, wherein the second receiving element delivers the baked unit to the first receiving element by rotating about a joint to expel the baked unit in the direction of the first receiving element.

16. The kiosk of any one of Clauses 1 to 15, wherein the baked unit is a loaf of bread.

17. The kiosk of any one of Clauses 1 to 16, wherein the receptacles extend into the chamber from an inner sidewall of the chamber.

18. The kiosk of any one of Clauses 1 to 17, wherein the receptacles are bread pans.

19. The kiosk of any one of Clauses 1 to 18, wherein the receptacles are arranged in a grid such that an individual receptacle corresponds to a location representing the intersection of a particular row and a particular column.

20. The kiosk of any one of Clauses 1 to 19, wherein the controller is configured to monitor the inventory of the baked units via the one or more sensors and communicate the inventory data to a remote server and/or a remote database.

21. The kiosk of any one of Clauses 1 to 20, wherein the kiosk is wirelessly coupled to a remote server.

22. The kiosk of any one of Clauses 1 to 21, wherein the controller moves the carrier to retrieve a particular baked unit from its receptacle in response to a customer request for the particular baked unit received from a remote server and/or an input device integrated with housing.

23. The kiosk of any one of Clauses 1 to 22, further comprising an input device at an exterior portion of the housing, wherein the input device is coupled to the controller and configured to receive input from a customer.

24. The kiosk of any one of Clauses 1 to 23, wherein the user interface includes a touch screen.

25. The kiosk of any one of Clauses 1 to 24, wherein, in response to a request for a particular baked unit made via the input device, the controller moves the carrier to retrieve the particular baked unit within the chamber and deliver the particular baked unit to an opening in the housing.

26. The kiosk of any one of Clauses 1 to 25, wherein the input device communicates to the customer which of the baked units in the receptacles are the warmest.

27. The kiosk of any one of Clauses 1 to 26, wherein the input device communicates to the customer the different types of baked units within the chamber and enables the customer to select a particular one of the displayed baked units.

28. The kiosk of any one of Clauses 1 to 27, further comprising a device configured to slice the baked units.

29. The kiosk of any one of Clauses 1 to 28, further comprising a device configured to bag one or more of the baked units.

30. The kiosk of any one of Clauses 1 to 29, wherein the controller is configured to detect if a baked unit has been handled by a customer and, in response to such detected handling, discard the handled baked units.

31. The kiosk of any one of Clauses 1 to 30, wherein the controller automatically selects a baked unit that is the warmest.

32. The kiosk of any one of Clauses 1 to 31, further comprising a means for tagging and tracking individual receptacles and/or individual baked units.

33. The kiosk of any one of Clauses 1 to 32, wherein the tagging includes associating one or more of the baked unit parameters with a particular baked unit.

34. The kiosk of any one of Clauses 1 to 33, wherein the controller is configured to wirelessly send and receive data from a mobile platform and/or mobile application.

35. A method for providing and distributing baked units, the method comprising:
  automatically receiving a baked unit into a receiving element positioned at least partially within a chamber of a kiosk;
  automatically moving the baked unit from the receiving element to an empty receptacle via a carrier configured to move horizontally and vertically within the chamber; and
  in response to receiving a request for a particular baked unit, moving the carrier to retrieve the particular baked unit and delivering the particular baked unit to a repository in the kiosk through which a customer may retrieve the particular baked unit.

36. The method of Clause 35, wherein, in response to a baked unit carried by the carrier moving outside of a range of a sensor, counting a number of increments moved by the carrier before leaving the range of the sensor.

37. The method of Clause 36, further comprising calculating the height of the baked unit based on the number of increments.

38. The method of Clause 35, wherein receiving the baked unit includes receiving the baked unit from a user.

39. The method of Clause 35, wherein receiving the baked unit includes receiving the baked unit automatically from an oven.

40. The method of Clause 39, wherein the kiosk is a first kiosk and the oven is integrated with a second kiosk.

41. The method of Clause 35, wherein receiving the baked unit from the second kiosk includes receiving the baked unit from an oven of the second kiosk.

42. The method of Clause 35, wherein the baked unit is a loaf of bread.

43. The method of Clause 35, wherein the baked unit is a first baked unit and receiving the first baked unit from the second kiosk occurs at a first time, and wherein the method further includes receiving a second baked unit from the second kiosk at a time.

44. The method of Clause 43, wherein the first baked unit is a first loaf of bread and the second baked unit is a second loaf of bread that is a different type of bread than the first loaf of bread.

45. The method of Clause 43, wherein the first baked unit is a first loaf of bread and the second baked unit is a second loaf of bread that is a size than the first loaf of bread.

46. The method of Clause 43, wherein the second time is within six minutes of the first time.

47. The method of Clause 43, wherein the second time is within five minutes of the first time.

48. The method of Clause 43, wherein the second time is within four minutes of the first time.

49. The method of Clause 43, wherein the second time is within three minutes of the first time.

50. The method of Clause 43, wherein the second time is within two minutes of the first time.

51. The method of Clause 43, wherein the second time is within one minute of the first time.

52. The method of Clause 43, wherein the time between automatically receiving the baked unit into the receiving element and when the controller displays the baked unit for selection by a customer is 30 seconds or less.

53. A system for producing, storing, displaying, and distributing a plurality of baked units, the system comprising:
  a production portion configured; and
  the kiosk of any one of Clauses 1-34.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

I. Overview

Figure 1:
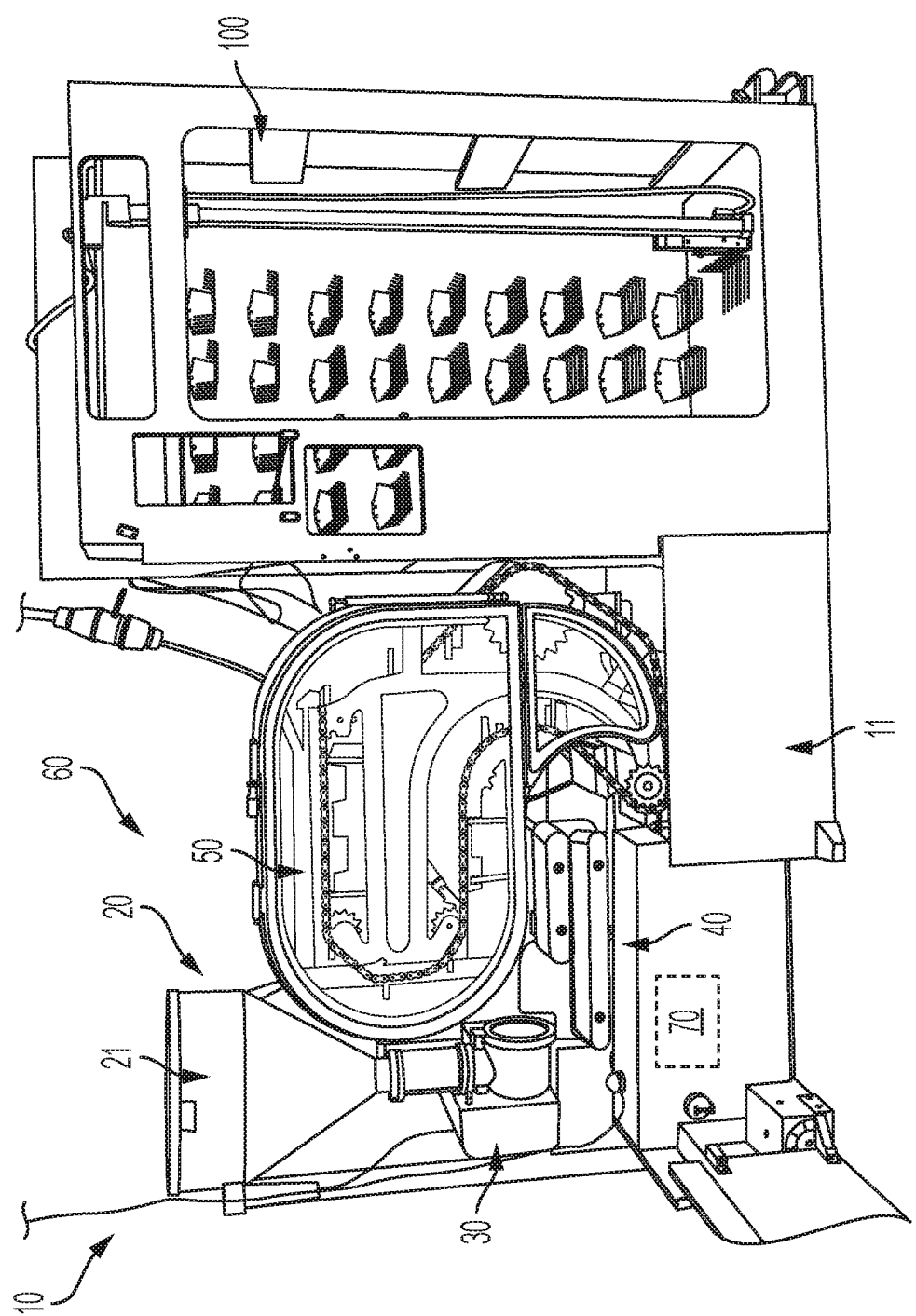
FIG. 1 shows a system for the automated production and distribution of baked goods in accordance with the present technology.

FIG. 1 illustrates an automated system 10 for producing and distributing a baked product in accordance with one or more embodiments of the present technology. The baked product may include, for example, a loaf of bread, sub rolls, dinner rolls, artisan bread, breadsticks, cake, cupcakes, and other baked goods. As shown in FIG. 1, the system 10 may include a production portion 60 configured to make the baked product and a kiosk 100 configured to receive the baked product from the production portion 60 and store, display, manage, and distribute the baked product.

The production portion 60 may comprise a priming assembly 20, a mixing assembly 30, a forming assembly 40, and an oven 50. The production portion 60 (or one or more assemblies thereof) and the kiosk 100 may be supported by or otherwise coupled to a frame 11. The production portion 60 may be configured to automatically and continuously move production ingredients (e.g., wet and dry ingredients) sequentially through the priming assembly 20, the mixing assembly 30, the forming assembly 40, and the oven 50 to produce a baked product. The priming assembly 20, for example, may be configured to receive, mix, and/or measure the ingredients separately before delivering the wet and dry ingredients to the mixing assembly 30. The amount of wet and dry ingredients may be represent an individual unit of a baked product, for example a single loaf of bread, a single cupcake, etc. In some embodiments, the amount of ingredients may represent a plurality of units of a baked product, for example, a plurality of loaves of broad, a plurality of rolls, a plurality of cupcakes, etc. The mixing assembly 200 may be configured to mix the wet and dry ingredients together to form a lump of dough, and delivers the lump of dough to the forming assembly 40. The forming assembly 40 may be configured to shape the lump of dough in preparation for baking, and may then deliver the shaped lump of dough to the oven 50 where the shaped lump of dough is baked into the final baked product (e.g., such as a loaf of bread).

The system 10 can further include one or more controllers 70 (one shown schematically in FIG. 1), each having memory and processing circuitry. In some embodiments, the system 10 may include a first controller carried by the production portion 60, and a second, separate controller carried by the kiosk 100. In some embodiments, the system 10 includes a single controller that monitors and controls both the production portion 60 and the kiosk 100. The one or more controllers 70 of the system may be coupled to and in communication with a remote server (not shown) and/or other systems 10 via a local area network ("LAN") and/or a wide area network ("WAN"). In any event, the one or more controllers may monitor various conditions at the kiosk and provide feedback to the production portion 60 to affect the type of baked product, the size of the baked product, the type of ingredients and amount of ingredients of the baked product, and the timing of one or more of the assemblies.

As shown in FIG. 1, the priming assembly 20 may include a dry ingredients priming unit and a wet ingredients priming unit. The dry ingredients priming unit of the illustrated embodiment comprises a vertically-oriented, conical hopper 21 coupled to a drive system and a screw or auger (not visible) that extends vertically through the center of the hopper 21 and is configured to mix dry ingredients fed to the hopper 21. Additionally or alternatively, the hopper 21 may include other means for mixing the dry ingredients. In some embodiments, the dry ingredients priming unit may include multiple hoppers.

In any event, the one or more hoppers 21 of the dry ingredients priming unit may be configured to receive dry ingredients from one or more sources. For example, in some embodiments, the system 10 can include one or more containers (not shown) configured to house one or more dry ingredients and feed the ingredients to the hopper 21. The timing, amount, and type of ingredient may be controlled or adjusted based on feedback received from the kiosk 100 and/or from input received by a customer at the kiosk 100 or via the Internet (via the one or more controllers 70). The containers can be fixed to the frame 11 (or other component of the system 10) and/or operably coupled to the hopper(s) via tubing and/or one or more valves. In such embodiments, the controller 70 can be coupled to the valves to automatically control the timing, amount, and/or composition of ingredients dispensed into the hopper(s) 21 from the container(s). In other embodiments, the dry ingredients can be manually dispensed into the hopper(s) 21 from the external source(s).

In some embodiments, the production portion 60 may include 1-60, 2-50, 20-30, at least 5, at least 10, at least 15, at least 20, at least 25, at least 30, or at least 50 hoppers and/or sources. The hoppers and/or sources may be conical and/or cubical, and/or whatever shape is most space-efficient for the application. Any of the hoppers and/or sources may include a mixing and/or agitating means.

Additional examples of production portions 60 and components thereof for use with the kiosks 100 disclosed herein may found at, for example, U.S. Pat. No. 8,091,471, filed Apr. 13, 2006, and U.S. patent application Ser. No. 15/753,261, filed Feb. 17, 2018, both of which are incorporated herein by reference in their entireties.

Figure 2A:
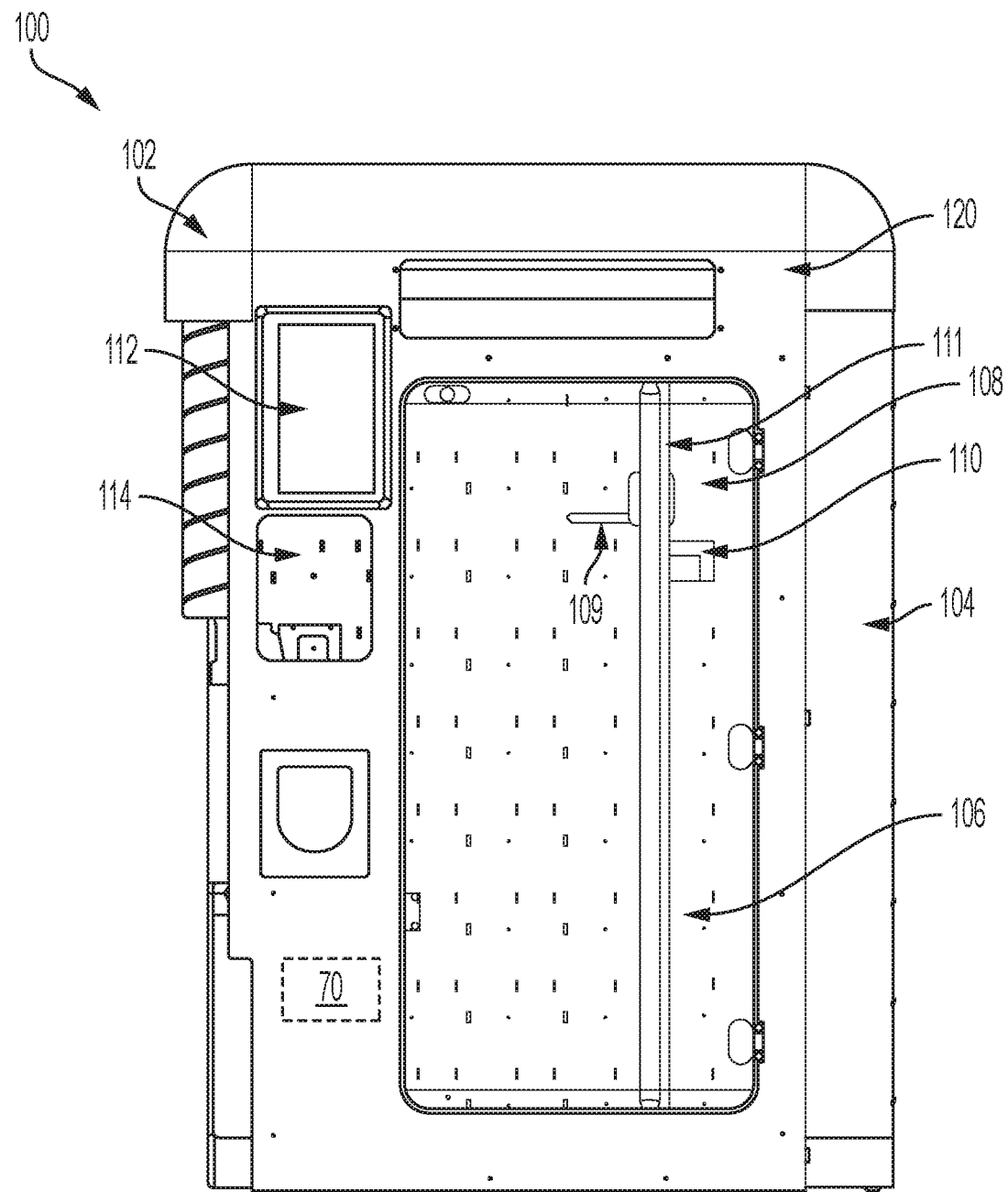
FIGS. 2A and 2B are isolated front and isometric views, respectively, of a kiosk for use with the systems of the present technology.
Figure 2B:
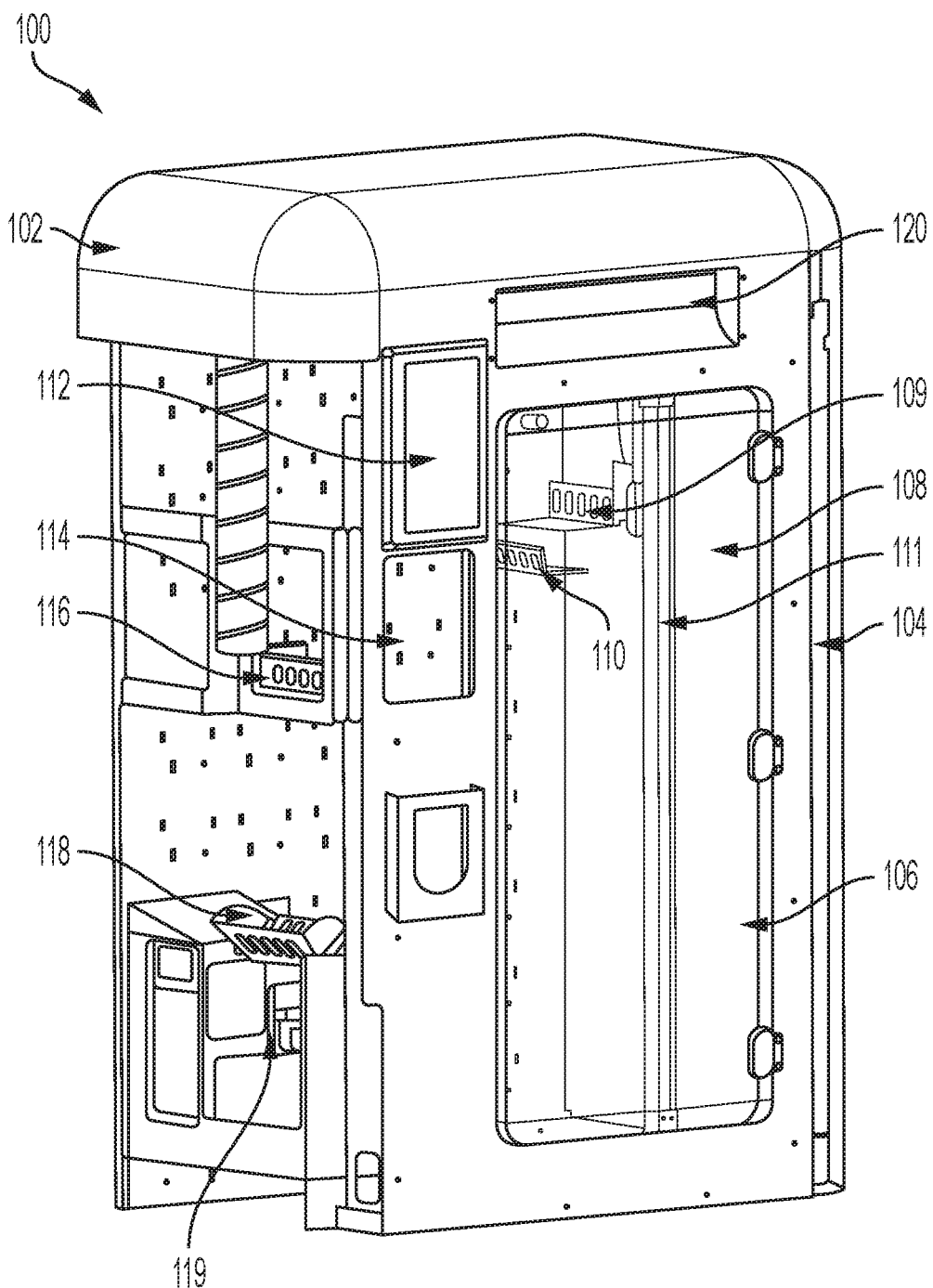

FIGS. 2A and 2B are isolated front and isometric views, respectively, of a kiosk 100 for use with the systems 10 of the present technology. As shown in FIGS. 2A and 2B, the kiosk 10 may include a housing 102 defining a chamber 106 therein. The housing 102 may have a door 104 that includes a transparent portion through which the interior of the kiosk 100 (including the baked product) is visible from the exterior of the kiosk 100. The chamber 106 may be configured to temporarily store 1-50 individual units of a baked product, each made by the production portion 60 (either individually or in a batch). The kiosk 10 may, for example, include a plurality of receptacles, such as a plurality of racks 110 (only a few shown in FIGS. 2A and 2B), each of which is configured to hold an individual baked unit (or group of units that comprises the baked product). The racks 110 may be configured to receive and support the baked product with the baked product in or on a container (such as a baking pan or sheet) or with the baked product free of any container or other device. The kiosk 100 and/or housing 102 may further include a dispensing region 114 comprising an opening through which the customer may receive the baked product.

The kiosk 100 may further include a receiving element 118 and a carrier system 108, both of which are positioned within the chamber 106. The receiving element 118 may be positioned adjacent an opening in the housing 102 through which the kiosk 100 is coupled to the production portion 60 (such as the oven 50). The receiving element 118 may be configured to receive the baked product directly from oven 50 or other portion of the production portion 60 and transfer the baked product to the carrier system 108. In some embodiments, the kiosk 100 is a standalone device and a user manually feeds or stocks baked product to the receiving element 118, carrier 108, and/or racks 110 of the kiosk 100.

The carrier system 108 may include horizontal and vertical tracks 110 (only the vertical track pictured), a plurality of actuators, and an arm 109 configured to move along horizontally and vertically within the chamber 106 via the tracks 110. The arm 109 may be configured to receive one or more of the baked products from the receiving element 118 and move within the chamber 106 to deliver the baked product to a predetermined receptacle or rack 110.

The transition receptacle 119, the arm 109, and receptacle(s) 110 may all be configured as combs in which teeth are evenly spaced and the openings between the teeth are slightly wider than the teeth. The neck, teeth and openings of the arm 109, for example, may be offset 180 degrees from the neck, teeth and openings of the transition receptacle 119 and the receptacle(s) 110 so that the teeth of the arm 109 may move vertically through the openings in the transition receptacle 119 and receptacles 110. In some instances, the hand off between (a) the transition receptacle 119 and the arm 109 and/or (b) the arm 109 and the receptacle 110 occurs by passing the teeth of the arm 109 through the openings of the opposing tray. The arm 109 may pass up through the transition receptacle 119 to pick up the baked product and the arm 109 passes down through the openings of the receptacle 110 to transfer the baked product to the receptacle 110.

The carrier system 108 may further comprise an extendable arm orthogonal to the tracks 110 enabling the carrier system 108 to travel on an XYZ axis. This configuration allows the carrier system 108 to move a baked product to any receptacle 110 within the chamber 106. When the carrier system 108 receives a baked product from the transition receptacle 119, it may query the controller 70 for the next available receptacle 110 and corresponding coordinates. The carrier system 108 may move the arm 109 to a position just above the receptacle 110 identified by the controller 70, and the actuator may extend to position the arm 109 in the same vertical plane as the targeted receptacle 110. The carrier system 108 may then move the arm 109 down below the receptacle 110, passing the teeth of the arm 109 through the openings in the receptacle 110, leaving the backed product in the receptacle 110. After depositing the baked product, the carrier system 108 may actuate back to its home position or enter into a sorting cycle in which the baked product is organized from warmest to coolest and open spaces are consolidated and available for new loaves exiting the production portion 60. In some embodiments, once a predetermined number of receptacles 110 or rows of receptacles 110 are full, the operator may be notified so that the baked product may be sliced, bagged, and placed on a display shelf.

Figure 2C:
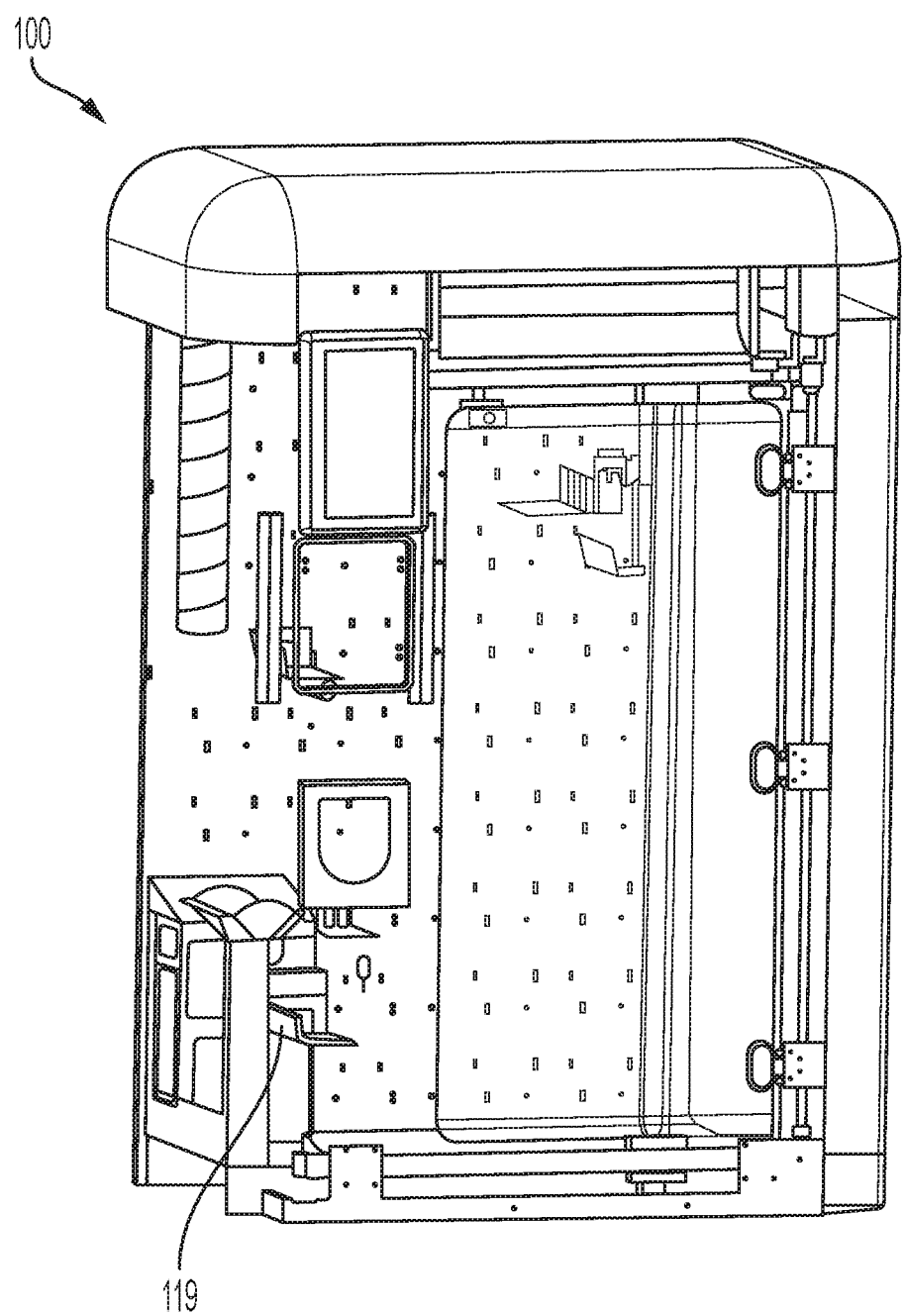
FIG. 2C is an isometric view showing the kiosk of FIGS. 2A and 2B with various portions of the housing removed to show the interior of the kiosk.

In some example methods of operation, at predetermined time intervals (e.g., every minute, every two minutes, every three minutes, every four minutes, every five minutes, every six minutes, every seven minutes, every eight minutes, etc.) a baked product exits the production portion 60 and falls into or is otherwise delivered to the receiving element 118. Once loaded with a baked product, the receiving element 118 may pivot and the baked unit is deposited on the transition tray 119 (see FIG. 2C). Before the start of the next cycle, the arm 109 of the carrier system 108 may move under the transition tray 119 to collect and analyze the baked product. If the baked product meets the programmed quality requirements, the controller 70 may be queried to identify the next available receptacle 110, and the baked product may be moved (via the carrier system 108) to the available receptacle 110 and indexed into the available inventory for purchase. If the baked product does not meet the programmed quality requirements it may be moved to an available receptacle 110, removed from the available inventory for purchase, and an operator may be alerted to remove the baked product and investigate the potential cause and/or the controller 70 may be triggered to evaluate the cause.

The dispensing region 114 may be safety protected with a light curtain safety sensor. If the light curtain is broken, the arm 109 may not move within the plane of the dispensing region 114. Similarly, the kiosk door 104 may be monitored by a contact sensor such that, if the door 104 is opened, the arm 109 may not move and/or an alarm may be triggered.

In some embodiments, the kiosk 100 may optionally include a vent pipe and blower to draw the aroma of fresh baked product of the vending kiosk 100 and out into the surrounding environment (i.e., a store).

In some embodiments, the kiosk 100 may include one or more sensors configured to analyze the individual baked units to determine one or more baked unit parameters, the baked unit parameters including one or more of a height, a color, a surface topography, a temperature, a volume, and/or a shape of the individual baked units. The number, variety, and location of the sensors and inputs may vary based on user requirements. For example, the controller 70 may assign a data profile to the baked product that contains the parameters and store the profiles in a local or remote database. Upon receipt of the baked product by the receiving element 118 and/or at any time while the baked product is within the kiosk 100, measurements taken by the one or more sensors may be communicated to the controller 70 and utilized to update the data profile and/or parameter fields. The data profile may be used to inform startup and calibration requirements for the production process in different environments, control product quality, improve processes, track customer preferences and sales patterns, sort inventory, and inform and direct customer selection and purchase.

By example, the system may track baking process inputs such as ingredient mass and volume, ingredient type, water temperature, ambient temperature, moisture content of dough, mass of dough, oven temperature, mixing, proving, and baking durations and timestamps. Likewise, one or more of the finished product attributes, such as height, uniformity, color, mass, variety, and age may also be tracked and fed back into the controller 70 to adjust one or more of the baking inputs. A variety of sensors may be utilized to build this data profile including infrared, near infrared, ultrasonic, laser range, optical, temperature, color, contact, proximity and pressure sensors.

In some embodiments, the data profile and/or the parameters may be communicated to the remote server and accessible via a mobile or Web application to a potential customer.

In some embodiments, the system 10 may be configured to customize the amount of data provided to the customer. For example, in some embodiments the customer may access the data for all finished product attributes to select their preferred baked product from the current inventory. Alternatively, the customer could use the range of finished product attributes or to order a baked product specific to their preferences. For example, a customer could order the warmest or freshest baked product, or the lightest baked product from the current available inventory, or a special-order product (for example, a baked product with extra seeds in it). Based on an analysis by the controller 70, the customer might be informed that their baked product is forecast to be of potentially marginal acceptability. Possibly giving the user the option to proceed anyway, but requiring them to pre-pay.

In some embodiments, the controller 70 may report to the user an analysis of the unique nutritional values of their specific loaf. In some instances, the controller 70 may advise the user what proportion of the researcher's recommended daily intake is present in each slice. The controller 70 may base its analysis on a fractional value of the baked product (such as a per-slice value), which in turn depends on the fractional properties, such as thickness, which our slicer-bagger system may offer as a variable.

In some embodiments, the system 10 may be configured to deliver specific, customized nutrition labels for all personalized loaves. The labels could be delivered via app/text, or by printed, self-adhesive labels. The system 10 may be configured to advise the user via a web or mobile app or via text message that their baked products are currently being prepared, are now ready for pick-up, etc.

The baking process data may also be used to improve the overall performance of the production process including identifying patterns that lead to exceptional or substandard loaves to inform decisions on adjustments such as baking or proving temperature, mixing speed, water level, baking time, etc. The process improvements may be automated based on feedback loops from controller 70 or manually adjusted by the operator.

As shown in FIGS. 2A and 2B, the kiosk 100 may include touchscreen for customer input and ordering. A customer may select their baked product based on a desired finished attribute such as warmest baked product or ready for slicing and bagging. Alternatively, the customer may select any available baked product based on its physical position within the cabinet or other identification marker such as a number plate on the receptacle 110. After selection by the customer, the controller 70 may send the arm 109 to retrieve the desired baked product based on the indexed data profiles and corresponding coordinates. The arm 109 may retrieve the warmest baked product, whether on the transition receptacle 119 or a receptacle 110, and transport it to and deposit it on a tray in the dispensing region 114. If the customer takes the baked product within a predetermined time interval (e.g., 40 seconds), the carrier system 108 may return to its home position. If the customer does not retrieve the baked product within the predetermined time interval, the carrier system 108 may return the baked product to the receptacle 110. If the customer handles the baked product and returns it to the dispensing region 114, the carrier system 108 may return the baked product to an available receptacle 110, remove it from the available inventory for purchase, and an operator may be alerted to remove the baked product and investigate the potential cause.

In some embodiments, a slicing and bagging unit (not shown) may sit on top of the kiosk 100 within the same footprint. The vertical track of the carrier system 108 may extend into the slicing and bagging unit and be configured to deposit a baked product in a basket above the kiosk. A baked product placed within the basket may be pushed through inline slicer blades by an actuating arm. After slicing, a second arm may push the sliced baked product into a bag that is blown open by another component. A declined plane may be incorporated to facilitate the movement of the baked product from the slicing area and into the bag. Once bagged, the baked product and the surrounding bag may be run through a vacuum sealing device and placed on a receiving tray. The carrier system 108 may retrieve the baked products from the receiving tray and place them on the back shelving where customers can select the baked products for purchase.

The system 10 may slice and bag loaves on demand either through a customer order, or by maintaining a consistent stock level, where new loaves are sliced and bagged to replace purchased loaves. The system 10 may track sales through the controller 70 and/or through sensors within the kiosk 100 (such as, for example, on the racks 110).

CONCLUSION

Although many of the embodiments are described above with respect to systems, devices, and methods for storing and distributing a baked product, the technology is applicable to other applications and/or other approaches, such as storing any perishable good. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1-2C.

The above detailed descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A kiosk for storing, displaying, and distributing a plurality of baked units, the kiosk comprising:
    a housing defining a chamber therein;
    a receiving element positioned within the chamber and configured to receive and support one or more of the baked units;

a carrier configured to move horizontally and vertically within the chamber, the carrier being configured to receive and carry one or more of the baked units;

one or more sensors configured to analyze the individual baked units to determine one or more baked unit parameters, the baked unit parameters including one or more of a height, a color, a surface topography, a temperature, a volume, and/or a shape of the individual baked units;

a plurality of receptacles disposed within the chamber and individually configured to support one or more of the baked units; and a controller coupled to the carrier and the sensors, the controller having memory and processing circuitry and configured to:

in response to detecting the presence of a baked unit at the receiving element, (a) move the carrier proximate the receiving element and procure the baked unit from the receiving element, and (b) deliver the baked unit to one of the plurality of receptacles; and move the carrier to retrieve a particular baked unit from its receptacle and deliver the particular baked unit to an opening in the housing through which a customer may retrieve the particular baked unit.

2. The kiosk of claim 1, wherein the baked unit is a loaf of bread.

3. The kiosk of claim 1, wherein the receptacles extend into the chamber from an inner sidewall of the chamber.

4. The kiosk of claim 1, wherein the receptacles are bread pans.

5. The kiosk of claim 1, wherein the receptacles are arranged in a grid such that an individual receptacle corresponds to a location representing the intersection of a particular row and a particular column.

6. The kiosk of claim 1, wherein the controller is configured to monitor the inventory of the baked units via the one or more sensors and communicate the inventory data to a remote server and/or a remote database.

7. The kiosk of claim 1, wherein the controller receives data from the one or more sensors characterizing one or more of the baked unit parameters and compares the data to a predetermined data set of baked unit parameters.

8. The kiosk of claim 1, wherein the carrier is moveable along vertical and horizontal tracks positioned within the chamber, and wherein the carrier includes an extender that is configured to extend and retract in a direction generally orthogonal to the vertical and horizontal tracks.

9. The kiosk of claim 1, wherein the carrier includes an extender that is configured to extend away from the carrier towards one of the receptacles proximate the carrier to deliver a baked unit to the receptacle.

10. The kiosk of claim 1, wherein the kiosk is a standalone kiosk.

11. The kiosk of claim 1, wherein the housing surrounds the chamber such that an internal environment of the chamber is self-contained.

12. The kiosk of claim 11, wherein the chamber has a controlled temperature.

13. The kiosk of claim 11, wherein the chamber has a controlled pressure.

14. The kiosk of claim 11, wherein the chamber has a controlled humidity.

15. The kiosk of claim 1, wherein the kiosk is configured to be coupled to an adjacent kiosk, and wherein the adjacent kiosk provides the baked unit to the receiving element of the kiosk.

16. The kiosk of claim 15, wherein a side portion of the housing includes an opening through which the adjacent kiosk transfers the baked unit to the kiosk.

17. The kiosk of claim 1, wherein at least one of the one or more sensors is an imaging device coupled to the controller and configured to send image data of the baked units to the controller for processing.

18. The kiosk of claim 17, wherein the controller determines at least one of the baked unit parameters based on the image data.

19. The kiosk of claim 1, wherein the receiving element is a first receiving element and the kiosk further comprises a second receiving element positioned within the chamber and configured to receive and support a baked unit.

20. The kiosk of claim 19, wherein the second receiving element delivers the baked unit to the first receiving element by rotating about a joint to expel the baked unit in the direction of the first receiving element.

* * * * *